(12) United States Patent
Wang

(10) Patent No.: US 11,095,449 B2
(45) Date of Patent: Aug. 17, 2021

(54) SYSTEM AND METHOD FOR SECURELY PROCESSING AN ELECTRONIC IDENTITY

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 155 days.

(21) Appl. No.: 16/348,476

(22) PCT Filed: Dec. 16, 2016

(86) PCT No.: PCT/US2016/067191
§ 371 (c)(1),
(2) Date: May 8, 2019

(87) PCT Pub. No.: WO2018/111302
PCT Pub. Date: Jun. 21, 2018

(65) Prior Publication Data
US 2019/0363889 A1     Nov. 28, 2019

(51) Int. Cl.
| H04L 9/32 | (2006.01) |
| G06F 21/32 | (2013.01) |
| H04L 9/00 | (2006.01) |
| H04L 9/06 | (2006.01) |
| H04L 9/08 | (2006.01) |
| H04L 29/06 | (2006.01) |

(52) U.S. Cl.
CPC ............ *H04L 9/3236* (2013.01); *G06F 21/32* (2013.01); *H04L 9/006* (2013.01); *H04L 9/0643* (2013.01); *H04L 9/08* (2013.01); *H04L 63/0861* (2013.01); *H04L 2209/38* (2013.01)

(58) Field of Classification Search
None
See application file for complete search history.

(56) References Cited

U.S. PATENT DOCUMENTS

| 10,013,690 | B2 * | 7/2018 | Kalgi | .................. | G06Q 20/382 |
| 10,140,615 | B2 * | 11/2018 | Carpenter | .......... | G06Q 20/3821 |
| 10,198,728 | B2 * | 2/2019 | Huxham | .............. | G07F 19/204 |
| 10,454,693 | B2 * | 10/2019 | Pirzadeh | ............ | G06Q 20/3263 |

(Continued)

FOREIGN PATENT DOCUMENTS

| EP | 3 009 972 | 4/2016 |
| WO | 2004006076 | 1/2004 |
| WO | 2015179637 | 11/2015 |

OTHER PUBLICATIONS

EP16923701.3, "Extended European Search Report", dated Sep. 12, 2019, 7 pages.

(Continued)

*Primary Examiner* — Piotr Poltorak
(74) *Attorney, Agent, or Firm* — Kilpatrick Townsend & Stockton LLP

(57) ABSTRACT

A method for providing identification using an endpoint device is disclosed. The endpoint device may include an electronic identity that is unique and can be securely stored. The electronic identity may be passed to an access device along with signed interaction data and a cryptogram. The access device may generate an authorization request with the cryptogram and may send it to a remote server computer for further processing.

20 Claims, 7 Drawing Sheets

(56) References Cited

U.S. PATENT DOCUMENTS

| | | | |
|---|---|---|---|
| 10,666,690 B2 | 5/2020 | Friend et al. | |
| 10,769,627 B2* | 9/2020 | Huxham | G06Q 20/02 |
| 2001/0051924 A1* | 12/2001 | Uberti | G06Q 20/04 |
| | | | 705/44 |
| 2004/0064568 A1* | 4/2004 | Arora | H04L 67/1059 |
| | | | 709/228 |
| 2006/0131412 A1* | 6/2006 | O'Brien | H04L 9/3271 |
| | | | 235/451 |
| 2007/0150419 A1* | 6/2007 | Kozlay | G06Q 20/40145 |
| | | | 705/67 |
| 2011/0082802 A1 | 4/2011 | Baghdasaryan et al. | |
| 2011/0154130 A1* | 6/2011 | Helander | H04L 65/1006 |
| | | | 714/48 |
| 2011/0161659 A1* | 6/2011 | Himawan | H04W 12/0609 |
| | | | 713/156 |
| 2012/0109818 A1* | 5/2012 | Carlson | G06Q 20/3223 |
| | | | 705/39 |
| 2012/0143768 A1* | 6/2012 | Hammad | G06Q 20/38215 |
| | | | 705/67 |
| 2014/0040147 A1 | 2/2014 | Varadarajan et al. | |
| 2015/0178724 A1 | 6/2015 | Ngo et al. | |
| 2015/0180836 A1 | 6/2015 | Wong et al. | |
| 2015/0302390 A1* | 10/2015 | Huxham | H04W 12/0608 |
| | | | 705/67 |
| 2015/0332262 A1* | 11/2015 | Lingappa | G06Q 20/322 |
| | | | 705/71 |
| 2015/0339664 A1* | 11/2015 | Wong | H04L 63/0823 |
| | | | 705/71 |
| 2016/0019533 A1 | 1/2016 | Wu et al. | |
| 2016/0092872 A1* | 3/2016 | Prakash | G06Q 20/3265 |
| | | | 705/65 |
| 2016/0218875 A1* | 7/2016 | Le Saint | H04L 9/0825 |
| 2016/0260169 A1 | 9/2016 | Naeem et al. | |
| 2016/0283941 A1 | 9/2016 | Andrade | |
| 2017/0011394 A1* | 1/2017 | Kumar | G06Q 20/401 |
| 2017/0171755 A1* | 6/2017 | Grange | H04L 9/3271 |
| 2017/0185761 A1* | 6/2017 | Stanwood | H04L 9/0863 |
| 2017/0243208 A1* | 8/2017 | Kurian | G06Q 20/40 |
| 2018/0047023 A1* | 2/2018 | Bouda | G06Q 20/20 |
| 2018/0137272 A1* | 5/2018 | Kamal | H04L 9/3247 |
| 2019/0295162 A1 | 9/2019 | Wang et al. | |

OTHER PUBLICATIONS

PCT/US2016/067191, "International Search Report and Written Opinion", dated Sep. 13, 2017, 13 pages.

* cited by examiner

SYSTEM AND METHOD FOR SECURELY PROCESSING AN ELECTRONIC IDENTITY

CROSS-REFERENCES TO RELATED APPLICATIONS

This application is the U.S. National Phase of PCT Application No. PCT/US2016/067191, filed Dec. 16, 2016, the disclosure of which is incorporated by reference.

BACKGROUND

In today's technological environment, it is common for a user to authenticate his identity by registering authentication data with a service provider that may confirm the registered user. The registered authentication data is then used by the user to gain access to a resource if it is determined that the user is trustworthy and should be authorized.

For example, an individual may wish to establish an account that tracks his assets such as cash or ownership of property. The account may be managed by a central authority such as a bank that stores authentication data pertaining to the user in a central database. The authentication data may then be used by the user to prove his identity and show proof of ownership over the account and the assets therein. When the user wants to gain access to a point of entry or to a resource, the user may present the registered authentication data (e.g. name and account number) to the provider of the resource. The resource provider may then forward the authentication data to the central authority so that the authority may authenticate the identity of the registered account holder and determine if there exists a sufficient amount of assets available to cover the resources (i.e. an amount of funds greater than the transaction amount). The central authority may then decide to authorize the transaction, thereby providing assurance to the resource provider that they will be sufficiently compensated.

Most authorization systems that operate in this manner, require a user to maintain a multitude of disparate authentication data in order to manage assets spread across a multitude of accounts belonging to the same owner. For example, a user may present his identity (name, address, social security number, etc.) to a multitude of credit authorities and may then receive a multitude of credit card numbers registered to him in order to keep track of how assets and credit are being moved during each transaction. This can make registration and use of the accounts cumbersome for the user as the maintenance of multiple accounts is involved, each being managed at disparate databases.

Furthermore, during a transaction, the authentication data (e.g. credit card number, address, etc.) must somehow be kept secret so that data cannot be stolen and used to steal someone's identity and gain access to his assets. Often times, tokenization schemes and mapping of aliases to hidden authentication data are performed in order to conceal sensitive information. This can prove to be both costly and unsecure, as mapping and storage needs to be carried out by dedicated central servers and databases which may be hacked, thereby exposing everyone's authentication data and identities. A hacker may also alter records in this manner, which may be difficult to dispute as the record may only exist in a single location that is now compromised. In addition, devices provisioned with authentication data may also be hacked or stolen, and may be used by an individual pretending to be the user.

Embodiments of the invention address these and other problems, individually and collectively.

BRIEF SUMMARY

Embodiments of the disclosure are directed to a system and method for securely processing an electronic identity.

One embodiment of the invention is directed to a method receiving, by the endpoint device, from an access device, interaction data; generating, by the endpoint device, an interaction record comprising the interaction data and an electronic identity of a user, the electronic identity being mathematically derived from a combination of information associated with the user; retrieving, by the endpoint device, a private key of the user; signing, by the endpoint device, the interaction record using the private key of the user; encrypting, by the endpoint device, at least the interaction data using a limited-use key associated with limited-use parameters to form a cryptogram; and transmitting, by the endpoint device, to the access device, the cryptogram and the signed interaction record, wherein the cryptogram is thereafter forwarded to a server computer in an authorization request message, and wherein the server computer is configured to decrypt the cryptogram and validate the electronic identity.

Another embodiment of the invention is directed to a server computer configured to perform the above-noted method.

Another embodiment of the invention is directed to a method. The method includes receiving, from an access device, an authorization request message comprising a cryptogram and a dynamic set of data, wherein the cryptogram comprises encrypted interaction data, and an electronic identity of a user; determining, based on the dynamic set of data, a limited-use key associated with limited-use parameters; decrypting the cryptogram using the limited use key; validating the limited-use parameters associated with the limited-use key; validating the electronic identity of the user; and approving the authorization request message or forwarding the authorization request message to an authorizing entity if the electronic identity and the limited-use parameters are validated.

These and other embodiments of the invention are described in further detail below.

DETAILED DESCRIPTION

Figure 1:
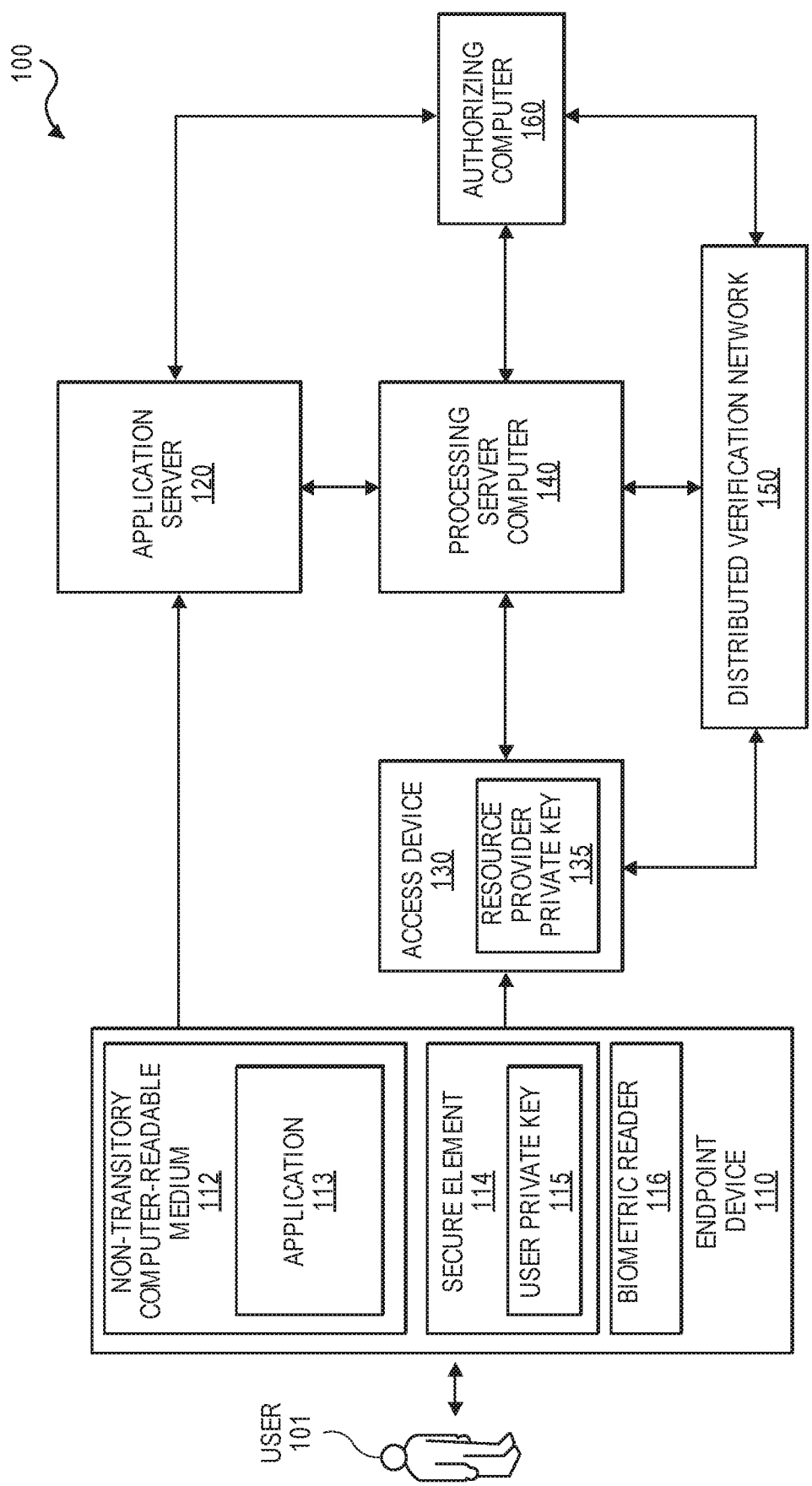
FIG. 1 shows a block diagram of a system for conducting a transaction according to embodiments of the invention.

Embodiments of the invention are directed to securely processing an electronic identity. In some embodiments, electronic identities can be securely stored and may be used when presenting proof of human identity such as through biometric verification. Electronic identities may be used to identify interacting parties in an interaction record, which is added to an immutable electronic record. In embodiments of the invention, interactions records may be encrypted when being transported for processing, and may only be valid if specific limited-use parameters are satisfied.

Embodiments of the invention address multiple vulnerabilities that may be present in typical authorization systems. Firstly, according to embodiments of the invention, interaction records may include a signature that is created using a private key. The private key may be unique to the user and may be stored in a secure element that can only be accessed by the user using biometric verification. This prevents an individual from interacting on behalf of the user without the user's consent.

Secondly, interaction records may be encrypted, therefore preventing an unauthorized person from intercepting an interaction record and altering or using the contents of the interaction record, such as the electronic identity is used in a fraudulent manner. In some embodiments, interaction records can be encrypted using limited-use keys defined by limited-use parameters. This may limit the harm that an unauthorized person might create if both the endpoint device and user biometric data have somehow been compromised.

Finally, in embodiments of the invention, electronic identities may be verified over a distributed network of trusted entities. Each entity in the disturbed network may possess a public verification key that may be used to confirm the signature generated by the private key stored in the secure element of the endpoint device. Each trusted entity can also validate interaction records in an electronic record.

Prior to discussing the details of some embodiments of the present invention, description of some terms may be helpful in understanding the various embodiments.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

An "application server" may be any computing device configured to provide remote support for an endpoint device. The application server may be associated with a set of computer executable instructions to be installed on, and executed from, an endpoint device (e.g., a mobile application). The application server may provide any suitable service and/or processing for the endpoint device. For example, the application server may perform calculations on behalf of the endpoint device. In some embodiments, the application server may maintain an account for one or more users. In some cases, the application server may be capable of generating an electronic identity for an individual, which can be used to authenticate the individual during an interaction. The application server may also store any protocols and/or user preferences related to the operation of the endpoint device.

An "endpoint device" may be any electronic device capable of establishing a communication session with another electronic device (e.g., an application server) and transmitting/receiving data from that device. An endpoint device may include the ability to download and/or execute mobile applications. Endpoint devices may include mobile communication devices (e.g., mobile phones), personal computers, laptops, wearable devices, and/or IoT devices such as smart televisions, refrigerators, thermostats, etc. Other examples of endpoint devices may include mobile vehicles that have remote communication capabilities (e.g., cars, motorcycles, boats, etc.).

A "mobile communication device" may be any portable electronic device that has a primary function related to communication. For example, a mobile communication device may be a smart phone, a personal data assistant (PDA), or any other suitable handheld device.

A "blockchain" can be a distributed database that maintains a continuously-growing list of records secured from tampering and revision. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions. The security of a blockchain may be obtained using a cryptographic scheme.

A "cryptographic key" may be any string of bits used by a cryptographic algorithm to transform plain text into cipher text or vice versa. Cryptographic keys may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

An "electronic identity" may be any suitable string of characters or symbols used to identify an entity (e.g., a person or device). In some embodiments, the electronic identity may be mathematically derived from information associated with a user. For example, in some embodiments, an electronic identity may be a value calculated by hashing one or more input values (customer name, country code, etc.) available to multiple entities. In this way, the electronic identity may be independently generated by any entity that has the prerequisite information. An electronic identity may be altered (e.g., hashed and/or encrypted) information associated with a user. For example, in some embodiments, an electronic identity may be derived from a combination of a country code, customer name, date of birth, and last four digits of a social security number such as SHA256 (USA*JOHN SMITH*19700101*1234). Hashing this value may result in a seemingly random string of characters, such as 754WD2E2513BF546050C2D079FF5D65AB6E318E and this can be an electronic identity. In some embodiments, the electronic identity is associated with a passphrase that is provided in order to access any interaction record associated with the electronic identity. An electronic identity may sometimes be referred to as an "eID" or electronic identifier.

An "electronic record" may be any record of one or more transactions stored electronically. For example, an electronic record may comprise a number of interaction records associated with an electronic identity. In some embodiments, an electronic record may be compiled by identifying each of the interaction records recorded in a distributed environment that are associated with a particular electronic identity. In some embodiments, the electronic record may include a portion generated by, and signed using a private key associated with, the user with which the electronic identity is associated. In some embodiments, the electronic record may be in the form of or may be included a blockchain.

An "interaction record" can be any indication of a transaction that occurred between a user associated with an electronic identity and another entity. In some embodiments, each of the interaction records in an electronic record may be signed using a private key associated with the entity, such that they may be verified using a public key associated with the entity. An interaction record may include an indication of a location of user-specific information (e.g., an address in a database table).

A "private key" is a type of cryptographic key that is kept secret by a party. A private key may be used to sign transactions such that they may be verified using the verification network.

A "public key" may be a type of cryptographic key that is distributed to, or available to, some entity over than a party holding a corresponding private key. In some embodiments, the key may be publically available, while in other cases it may be distributed to nodes in a network, but the network itself may not be accessible to the general public. A public key may be made available to nodes of a verification network so that signed transactions associated with the public key may be verified by the nodes.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key.

A "verification network" may be any set of nodes (computer systems and components) configured to provide verification for a transaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. In some embodiments, each of the nodes in a verification network may be computing devices belonging to a particular group or organization.

Details of some embodiments of the present invention will now be described.

FIG. 1 shows a block diagram of system 100 for conducting a transaction according to embodiments of the invention. System 100 may comprise application server 120 for managing accounts, processing server computer 140 for processing received transactions, distributed verification network 150 for verifying identities and records, and authorizing computer 160 for evaluating and authorizing records.

In FIG. 1, endpoint device 110 belonging to user 101 may be used to initiate a transaction or interaction with access device 130. Data corresponding to the interaction may be authenticated, verified, validated, and authorized by processing server computer 140, distributed verification network 150, and/or authorizing computer 160. Interactions may be processed using an electronic identity of user 101 stored on endpoint device 110. Storage and management of the electronic identity as well as the parameters that govern its usage may be supported by application server 120, which may receive, transmit, and/or update data stored in application 113.

Endpoint device 110 may comprise any suitable computing device capable of interacting with entities using a stored electronic identity in accordance with embodiments of the disclosure. The endpoint device may include at least a processor, a memory, one or more communication interfaces, and a biometric reader 116.

The endpoint device 110 may include one or more communication interfaces configured to enable communication between the endpoint device 110 and another electronic device (e.g. application server 120 and/or access device 130). The communication interfaces may be used to transmit and receive data to and from servers and access devices in order to conduct a transaction. In some embodiments, the communication interface may include both long range and short range communication means. For example, the communication interface may include an antenna configured to connect to a cellular network in order to enable communication with various other components of the depicted architecture. Endpoint device 110 may comprise more than one communication interface in order to communicate over multiple channels of communication. For example, endpoint device 110 may comprise a network interface for communicating with application server 120 and a contactless interface (e.g. NFC chip) for interacting with access device 130

The memory of the endpoint device 110 may include a secure execution environment such as a secure memory. In some embodiments, the secure memory may include secure element 114. The secure element (SE) 114 can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., user private key 115) received by the endpoint device 110 may be stored in secure element 114. Secure element 114 may store user private key 115 that may be used to sign an interaction record. User private key 115 may be secret and unknown to other entities, and may be associated with a corresponding public key that may be distributed to trusted entities to verify interactions signed using user private key 115. According to one embodiment, the public key may be a device ID unique to endpoint device 110.

The memory of endpoint device 110 may also include a non-transitory computer-readable medium 112 comprising computer-executable instructions that cause the processor to perform certain functions in accordance with embodiments of this disclosure. For example, computer-readable medium 112 may comprise application 113. Application 113 may be a mobile application such as a digital wallet application or mobile banking application. Application 113 may comprise code instructing endpoint device 110 to create and sign an interaction record.

Endpoint device 110 may also establish a connection with application server 120 that provides back end support for the endpoint device 110. For example, application server 120 may generate an electronic identity and may provide back end support for keeping the identity secure. In some embodiments, upon execution of instructions in application 113, endpoint device 110 may establish a communication session with application server 120 in which at least some processing is performed by application server 120 on behalf of application 113. In some embodiments, application server 120 may maintain an account associated with endpoint device 110 and/or user 101. The account maintained by application server 120 may store data related to the user. For example, application server 120 may store user data (e.g., demographic or other suitable information), documentation related to the user (e.g., bank statements, property deeds, etc.), or any other suitable user data. According to one embodiment, the user data is obtained from authorizing computer 160. Application server 120 may, upon receiving a request from application 113, compile at least a portion of the user data that it maintains into an electronic record. The electronic record may be associated with an electronic identity of the user. The application server 120 creates the electronic identity by hashing the user data, and then provides it to endpoint device 110. According to one embodiment, the electronic identity is generated by authorizing computer 160 and is provided to application server 120.

In one embodiment of the invention, application server 120 may distribute or receive data from distributed verification network 150. Application server 120 may communicate with the entities in distributed verification network 150 directly or through processing server computer 140. In another embodiment, application server 120 and processing server computer 140 may be of the same entity. Processing server computer 140 may be configured to process a cryptogram using data, parameters, keys, and algorithms provided by application server 120. Processing server computer 140 may decrypt interaction data and may submit the interaction data to authorizing computer 160 to authorize the interaction. Authorizing computer 160 may authorize an interaction based on at least a portion of data stored in an electronic record. For example, authorizing computer 160 may evaluate an electronic record to confirm a sufficient amount of assets to cover a transaction. In one embodiment, authorizing computer 160 may be a trusted entity in distributed verification network 150.

During a transaction or interaction, according to system 100, user 101 uses endpoint device 110 to electronically interact with a resource provider. Endpoint device 110 may store an electronic identity of user 101 in application 113. To use the electronic identity in a transaction, user 101 may provide authentication data. According to embodiments of the invention, endpoint device 110 may have been provisioned with the authentication data using application 113. The authentication data may comprise the user private key 115 that is generated by application server 120 and that is uniquely assigned to user 101. Private key 115 may have been generated by application server 120.

User private key 115 may be used by application 113 to sign an interaction record that is associated with the electronic identity of user 101 when user 101 interacts with the resource provider. Interactions between user 101 and the resource provider may occur using communication between endpoint device 110 and access device 130. For example, access device 130 may be located at the resource provider (e.g. at a merchant location) and user 101 may interact with the resource provider by communicating with access device 130 using near-field communication capabilities of endpoint device 110. Access device 130 may be a POS terminal that receives resource or product information (e.g. by scanning a barcode or other product identifier of the product) to generate interaction data such as a transaction amount. The transaction amount may be displayed to user 101, and access device 130 may request user 101 to present a method for paying for the transaction amount so that access to the resource may be authorized. In another embodiment, access device 130 may be a network gateway that allows a user to interact with a resource provider over the internet. According to one embodiment, the resource provider may be a trusted entity of distributed verification network 150 or may be an entity capable of communicating with trusted entities of distributed verification network 150.

Endpoint device 110 may also comprise a biometric reference template that is obtained from user 101 using biometric reader 116. The biometric reference template may be stored on endpoint device 110, and may be matched to a biometric sample template provided during an interaction initiated by user 101. User 101 may provide biometric templates to endpoint device 110 using biometric reader 116. Biometric reference templates and biometric sample templates may be compared by application 113, and access to user private key 115 may be temporarily granted if the templates match.

According to embodiments of the invention, user 101 may choose to conduct a transaction using his electronic identity stored on endpoint device 110. When user 101 is ready to request or pay for access, he may access application 113 by, for example, selecting an application icon on the display of endpoint device 110. Application 113 may then initiate or prompt user 101 to initiate communication with access device 130. For example, application 113 may prompt user 101 to hold endpoint device 110 in close proximity to access device 130 so that interaction data may be transmitted to endpoint device 110. In one embodiment, access device 110 signs the interaction data using resource provider key 135 before submitting the interaction data. For example, access device 110 may append a digital signature to the interaction data before sending the interaction data to endpoint device 110. In this example, interaction data may include at least a transaction amount of the transaction, a resource provider identifier (e.g., a merchant identifier), an unpredictable number, and/or an access device identifier (e.g., a terminal ID). Once interaction data has been transmitted from the access device 130 to endpoint device 110, endpoint device 110 may generate an interaction record comprising the interaction data (e.g. transaction amount, transaction timestamp, merchant data, product data, etc.) as well as the electronic identity of user 101. In one embodiment, the electronic identity may be a hash of information about user 101 (e.g. name, date of birth, social security number, etc.) that is added to the interaction record or that may be part of the interaction record.

In order to use the electronic identity in the interaction, user 101 may cause the endpoint device 110 to sign the interaction record with the user private key 115. Application 113 may prompt user 101 to present his biometric sample to biometric reader 116 in order to initiate the signing. User 101 may then present his biometric sample (e.g. fingerprint, voice, iris, etc.), which is matched to a biometric reference template stored on endpoint device 110. If the templates match, then temporary access to user private key 115 is granted and user private key 115 is then used to sign the interaction record. The resulting digital signature may be attached to the interaction record or be part of the interaction record.

According to one embodiment, the interaction record may be transmitted back to access device 130 so that the resource provider may sign the interaction with their secret resource provider private key 135. The resource provider's signature may later be verified in the same manner that the user's signature is verified. Corresponding public keys used for verification of signatures may be distributed to distributed verification network 150 prior to or during the interaction. Once the interaction record has been signed by both parties, the interaction record may be sent back to endpoint device 110 so that the interaction record may be encrypted in application 113 before transmission to processing server computer 140.

In some embodiments, if the interaction record has been signed by both parties in the transaction, the interaction record may be encrypted before submission for processing. The signed interaction record may be received by endpoint device 110 from access device 130, and the interaction record may be encrypted by application 113 using an encryption algorithm and a limited-use key. According to embodiments of the invention, the interaction record may be encrypted using a dynamic set of data such as a limited-use key defined by limited-use parameters. The dynamic set of data may be limited-use in the sense that the dynamic set of data can be used for only a limited time or a limited number of interactions, and may need to be renewed, refreshed, updated, or replenished when the dynamic set of data has exhausted its limited usage. For example, the dynamic set of data may include a limited-use key (LUK) that is used as an encryption key to generate a transaction cryptogram during an interaction.

The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying electronic identity used in the transaction is still in good standing. The set of one or more limited-use thresholds enforced can be determined by application server 120 and may be validated by processing server computer 140. According to one embodiment, the state of the limited-use parameters during an interaction may be included with or appended to the interaction record and may be stored in an electronic record. For example, each interaction record may include the number of times a specific LUK has been used in addition to the current transaction. The limited-use parameters may then be evaluated by reading the entries in the electronic record. In another embodiment, LUKs and associated limited-use parameters are stored in a relational database managed by application server 120.

The set of one or more limited-use thresholds may include at least one of a time-to-live indicating the duration of time for which the LUK is valid, a predetermined number of interactions for which the LUK is valid, and/or a cumulative transaction amount indicating the total transaction amount summed across one or more transactions for which the LUK is valid, or any combination thereof. For example, a LUK may be valid for a time-to-live of five days, and a transaction conducted using that LUK after five days have elapsed since the LUK was generated may be declined. As a further example, a LUK may be valid for a cumulative transaction amount of five hundred dollars, and a transaction conducted using the LUK after that LUK has already been used for transactions totaling more than five hundred dollars may be declined.

It should be understood that the limited usage values described above are just examples, and that other usage limits can be used. For example, the number of interactions usage limit can be set to a number in the range of 2 to 10 interactions, or a number in the range of 5 to 50 interactions, etc., and the cumulative transaction amount can be set to a value in the range of $100 to $5,000, or a value in the range of $10 to $1000, etc.

In embodiments in which a LUK is associated with more than one limited-use thresholds, the usage of the LUK can be exhausted when any one of the limited-use thresholds is exceeded, or when some combination of the limited-use thresholds is exceeded. Hence, replenishment of the LUK may be triggered when any one of the limited-use thresholds is exceeded or is about to be exceeded, or when some combination of the limited-use thresholds is exceeded or is about to be exceeded. Before replenishment, application server 120 may send a notification to endpoint device 110 or another device of user 101, alerting user 101 to replenish the dynamic set of data stored in application 113. Replenishment may be requested by user 101 using application 113 and may require further authentication such as a username and password, biometric verification, etc. Replenishment of LUKs and other data in the dynamic set of data may be performed by application server 120, which may communicate the changes to application 113 and processing server computer 140.

The dynamic set of data may also include a key index that is associated with the LUK and is sent in clear text with the cryptogram. The key index may include information pertaining to the generation of the LUK. For example, in some embodiments, the key index may be used as a seed to generate its corresponding LUK. The key index may include time information (e.g., a timestamp) indicating when the LUK is generated, and/or may include a replenishment counter value indicating the number of times that the LUK has been renewed or replenished for a particular account, mobile application, endpoint device, etc. In some embodiments, the replenishment counter value may indicate the number of times the LUK has been replenished within a predetermined time period, and the replenishment counter value may reset when each predetermined time period elapses. This predetermined time period may correspond, for example, to the smallest unit of time determinable from the time information, although other predetermined time periods can be used. As an example, if the time information included in the key index indicates down to which hour the current LUK is generated, the counter value may indicate the number of times the LUK has been replenished in the hour. In some embodiments, the LUK may include an application transaction counter value indicating the number of transactions that has been previously conducted by application 113 at the time the LUK is generated, or may include a pseudo random unpredictable number generated by application server 120 or by a suitable entity involved in processing the transaction such as processing server computer 140 or authorizing computer 160. According to one embodiment, the unpredictable number may be generated using an algorithm that alters a previous unpredictable number with each transaction. It should be understood that the key index may include one or more pieces of information pertaining to the generation of the LUK, and that one or more or all pieces of information included in the key index may be used as a seed to generate the LUK.

Once the cryptogram has been generated, endpoint device 110 may transmit the cryptogram and dynamic set of data to access device 130. Access device 130 may then generate an authorization request message comprising the cryptogram and dynamic set of data, and send it to processing server computer 140.

Processing server computer 140 may receive the authorization request message. Processing server computer 140 may then proceed to decrypt the cryptogram in the authorization request message so that the electronic identity may be authenticated and the interaction may be validated and authorized. Processing server computer 140 may decrypt the cryptogram by determining a symmetric limited-use key that may be used to reverse the encryption algorithm used by endpoint device 110 to generate the cryptogram. Processing server computer 140 may determine or retrieve the symmetric limited-use key by communicating with application server 120. For example, processing server computer 140 may determine the symmetric limited-use key by sending the key index and/or other data in the dynamic set of data to application server 120. Application server 120 may then retrieve the symmetric limited-use key by querying a database for a key with characteristics that match the dynamic set of data. Key characteristics may be in the form of a relational database in which each key is linked to its corresponding dynamic set of data. The retrieved key may then be sent to processing server computer 140.

Once processing server computer 140 has determined and obtained the symmetric limited-use key, processing server computer 140 may decrypt the cryptogram using the symmetric limited-use key. For example, the symmetric limited-use key may be input into a function that reverses the encryption algorithm and outputs the signed interaction record. Upon decryption, the contents of the interaction record including the interaction data, electronic identity, and signatures of the interacting parties may then be evaluated for processing.

After decrypting the cryptogram, processing server computer 140 may verify that the limited-use parameters associated with the limited-use key are valid. For example, processing server computer 140 may evaluate the number of times the limited-use key has been used by referencing an electronic record or by retrieving data from application server 120. For example, processing server computer 140 may determine that a limited-use key has been used 5 times, which may be the maximum amount of times the limited-use key may be used before requiring replenishment. Processing server 140 may then deem the interaction invalid and may submit an authorization response message to access device 130 indicating a declined interaction. According to one embodiment, the state of the limited-use parameters may also be confirmed over distributed verification network 150, by confirming the entries in the electronic record with trusted entities.

If the limited-use parameters are valid, processing server computer 140 may then authenticate the interaction record and electronic identity by communicating with the trusted entities in distributed verification network 150. For example, processing server computer 140 may read the electronic identity in the interaction record and may determine an electronic record of interactions involving the electronic identity. The electronic record may be present in a distributed ledger in blockchain format. For example, processing server computer 140 may determine an electronic record by compiling a list of blockchain entries containing the user's electronic identity. The trusted entities in distributed verification network 150 may then evaluate the electronic record and the authenticity of the interaction record and electronic identity contained therein.

Distributed verification network 150 may comprise a distributed environment implemented across a number of remote nodes, each of which represents a computing system or component. In some embodiments, each remote node within the distributed verification network 150 may contain copies of electronic records that may be verified against one another. In some embodiments, at least some of the remote nodes may each be owned and/or operated by at least one of the signing entity, a processing entity, and/or authorizing entity. In some embodiments, the distributed verification network 150 may comprise a number of computing devices operated by entities that each belong to a particular group or have obtained a particular certification. One or more of the remote nodes in distributed verification network 150 may act to verify an interaction record during a transaction, and may act to determine trust and associated transaction risk.

In accordance with at least some embodiments, the distributed verification network 150 may comprise a federated and/or permission-based environment. For example, in order to participate in, or use, the distributed verification network 150, an entity may need to be certified or otherwise authenticated. For example, the verification network 110 may require that each entity be subject to trust services management (TSM) policies and/or rules. In some examples, different entities may be subject to different policies based on the type of entity that it is. For example, servers associated with a banking institution may be trusted automatically, whereas servers associated with an individual may need to receive certification from a banking institute. In these examples, only trusted entities may have access to the distributed verification network 150.

The distributed verification network 150 may comprise of a plurality of nodes that may each verify the signature and confirm that they receive matching results. The consensus between the nodes may be used to accept or reject the interaction record. Consensus may be determined on a vote structure in which at least 50 percent of the nodes must verify the interaction record. In another embodiment, votes may be weighted such that more trustworthy entities have greater authority over an agreed upon result. For example, a bank may have a vote that is weighted to be twice that of a vote made by a merchant, and the resulting vote count may be held against a predetermined threshold to arrive at consensus.

Once the electronic identity has been authenticated, processing server computer 140 may then transmit the authorization request message comprising the signed interaction record and electronic identity to authorizing computer 160. Authorizing computer 160 may authorize the transaction and/or interaction based on at least a portion of the electronic record associated with the electronic identity. For example, authorizing computer 160 may determine that some of the interaction records in the electronic record correspond to transfers of funds and/or assets. The authorizing computer 160 may be a bank that may verify that there are enough funds and/or assets attributed to the electronic identity to cover the transaction amount of the interaction. Authorizing computer may then submit an authorization response message comprising an indication of approval or denial to processing server computer 140, which may be forwarded to access device 130 and/or application server 120 to inform the involved parties. In one embodiment, authorizing computer 160 may be one of the nodes in the distributed verification network, and both authentication and authorization of the interaction record may be performed simultaneously.

Authorizing computer 160 may then send the authorization response message to the access device 130 and/or endpoint device 110 via processing server computer 140 and/or application server 120. Authorizing computer 160 or processing server computer 140 may add the interaction record to the electronic record and distribute the updated electronic record to distributed verification network 150 and to application server 120. If the interaction or transaction has been approved, then the transaction may be finalized and the interaction record may be published/appended onto each entity's copy of the electronic record. User 101 may then be granted access and the proper assets may be officially allocated.

Figure 2:
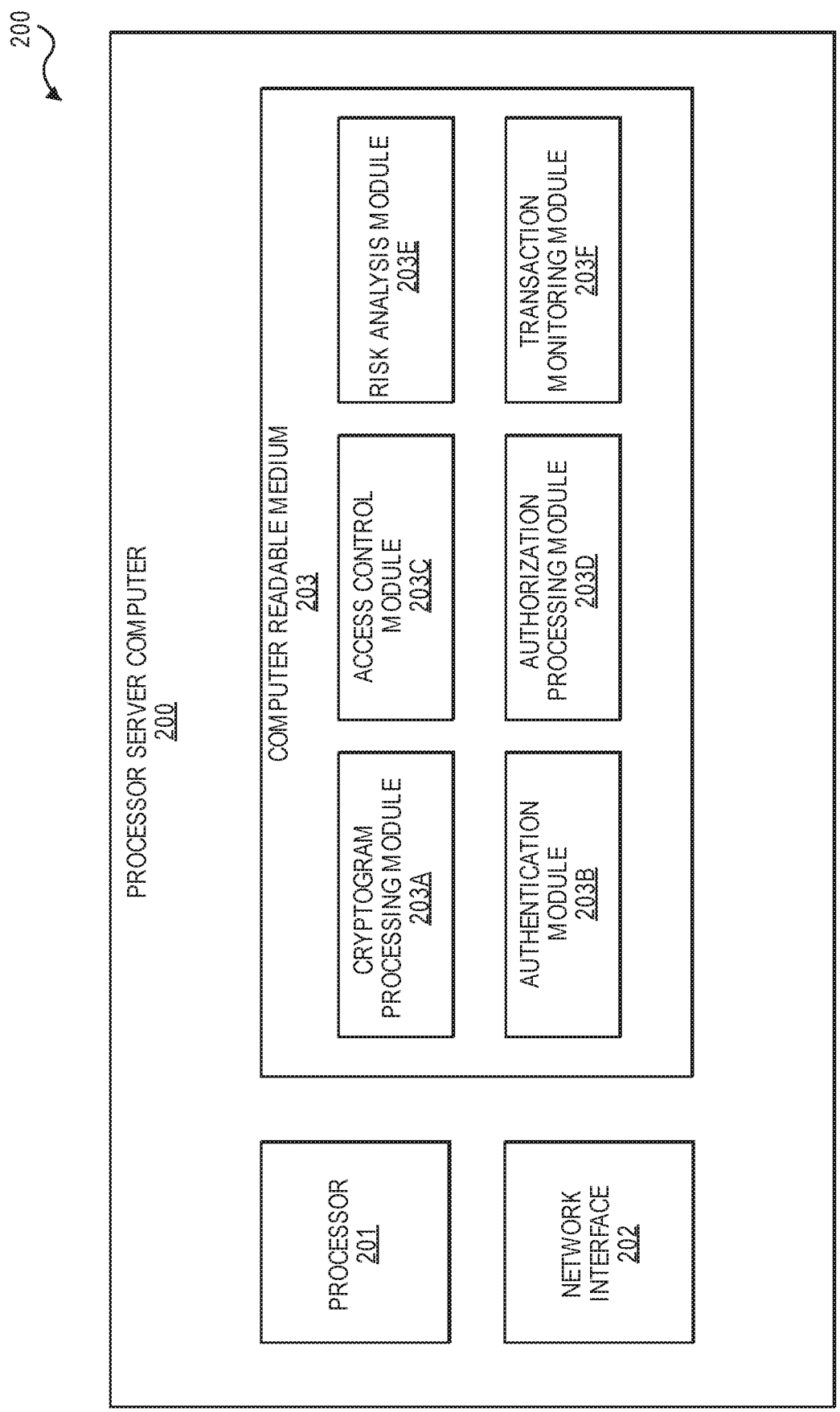
FIG. 2 shows a block diagram of a processing server computer according to embodiments of the invention.

FIG. 2 shows a block diagram of a processing server computer according to embodiments of the invention. Processing server computer 200 may be, for example, processing server computer 140 of FIG. 1. Processing server computer 200 may comprise one or more processor(s) 201 for executing instructions for performing tasks according to embodiments of the invention. Processing server computer 200 may also comprise network interface 202 for sending and receiving messages over a network such as the internet. Processer server computer 200 may further comprise computer readable medium 203 which may be, for example, a memory. The computer readable medium 203 and the network interface 202 may be coupled to the one or more processors 201.

The memory may store program instructions that are loadable and executable on the processor(s) 201, as well as data generated during the execution of these programs. Depending on the configuration and type of server, the memory may be volatile (such as random access memory (RAM)) and/or non-volatile (such as read-only memory (ROM), flash memory, etc.). Processing server computer 200 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for processing server computer 200. In some embodiments, computer readable medium may include multiple different types of memories, such as static random access memories (SRAMs), dynamic random access memories (DRAMs) or ROMs. The memory may include an operating system and one or more application programs or services for implementing the features disclosed herein. Computer readable medium 203 may also include record data, which provides data associated with a user and/or account.

Computer readable medium 203 may comprise a plurality of modules that may each comprise code for executing specific functions according to embodiments of the invention. The modules may include cryptogram processing module 203A for processing a cryptogram. According to embodiments of the invention, cryptogram processing module 203A may comprise code that instructs processor 201 to determine a symmetric limited-use key associated with a cryptogram. For example, cryptogram processing module 203A may instruct processing server computer 200 to receive an identifier such as a dynamic key index that identifies a limited-use key. Cryptogram processing module 203A may further instruct processing server computer 200 to retrieve an associated decryption key or symmetric limited-use key by accessing a database or by communicating with an application server over network interface 202. The application server may be application server 120 of FIG. 1, and may send the symmetric limited-use key and limited-use parameters to processing server computer 200.

Cryptogram processing module 203A may instruct processing server computer 200 to decrypt a cryptogram using a decryption key. This may be done by, for example, inputting a cryptogram into a decryption function along with the decryption key. The resulting output to the decryption function may be a message, such as an interaction record comprising an electronic identity, as well as one or more signatures identifying the origin of the message. Cryptogram processing module 203A may further comprise code for evaluating limited-use parameters and a dynamic set of data by comparing the dynamic set of data with the limited-use parameters. For example, the limited-use parameters may be data specifying that a limited-use key may only be used for 5 transactions and processing server computer 200 may receive a dynamic application transaction counter (ATC) that increments during each transaction. If the ATC is equal to 5, then the limited-use key (LUK) may be seen as exceeding its limited-use threshold and the cryptogram processing module 203A may instruct processing server computer 200 to reject the transaction. Alternatively, if the dynamic set of data satisfies the limited-use parameters, then cryptogram processing module 203A may determine that the LUK is valid.

Computer readable medium 203 may further comprise authentication module 203B for authenticating an electronic identity according to embodiments of the invention. Authentication module 203B may comprise code for reading an electronic identity, determining an electronic record associated with the electronic identity, determining a public key associated with the electronic identity, and verifying each interaction record in the electronic record by communicating with trusted computers through network interface 202. Authentication module 203B may further comprise code for receiving data regarding verification results. The verification results may be evaluated to determine a course of action as determined by access control module 203C. For example, access control module 203C may comprise instructions for generating an indication of "yes" or "no" regarding the authenticity of the electronic identity based on the verification results. Access control module 203C may comprise any number of logical conditions for controlling access to a resource based on predetermined criteria such as authenticity and/or trust associated with a requesting party.

Computer readable medium 203 may further comprise authorization processing module 203D for receiving, formatting, and transmitting authorization request messages and authorization response messages. Authorization processing module 203D may instruct processing server computer 200 to transmit an authorization request message comprising an interaction record and electronic identity to an authorizing computer through network interface 202. An authorization request message may further comprise a risk score or trust score relating to an interaction. Authorization processing module 203D may also comprise instructions for receiving an authorization response message from an authorizing computer. Authorization processing module 203D may further comprise instructions for forwarding an authorization response message to an access device and/or application server such as access device 130 and application server 120 of FIG. 1 respectively.

Computer readable medium 203 may also comprise risk analysis module 203E for assessing a level of risk or risk score associated with a requested interaction. For example, risk analysis module 203E may comprise logic for receiving transaction data, merchant data, user data, etc. and outputting a risk score (e.g. 0 to 100) quantifying the assessed risk of a transaction based on predetermined rules. Computer readable medium may further comprise transaction monitoring module 203F for identifying suspicious behavior associated with an interaction. For example, transaction monitoring module 203F may comprise logic for evaluating interaction records. Transaction monitoring module 203F may further generate an alert that is sent over network interface 202.

Figure 3:
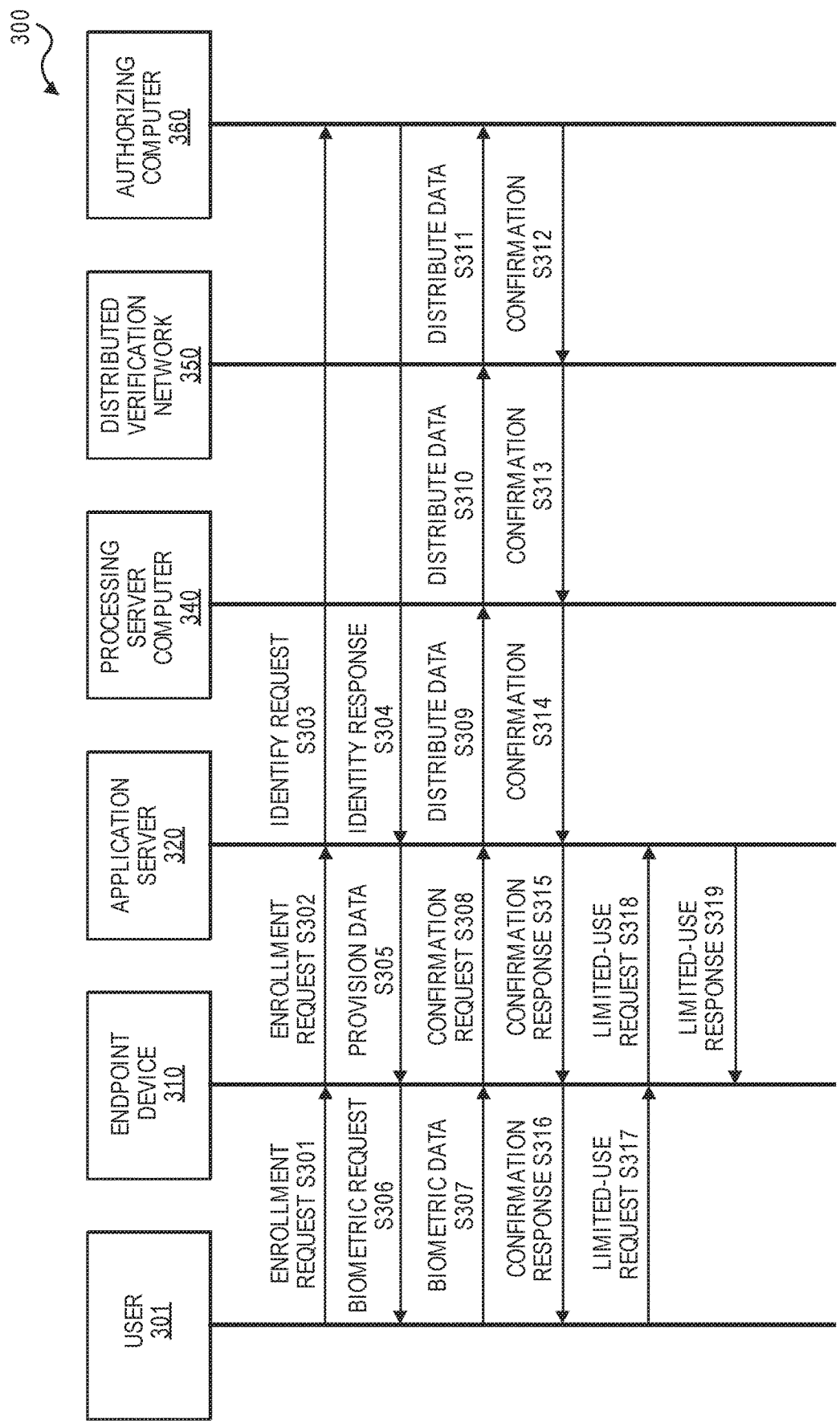
FIG. 3 shows a swim-lane diagram of an enrollment and provisioning method according to an embodiment of the invention.

FIG. 3 shows a diagram of an enrollment and provisioning process according to one embodiment of the invention. According to the embodiment, user 101 first initiates an enrollment request S301. For example, user 301 may fill-out an enrollment form displayed on endpoint device 310 with identifying information such as full name, address, date of birth, etc. The user 301 may then submit the form by selecting a "submit" button that commands endpoint device 310 to submit the enrollment request comprising identifying information to application server 320 in S302. Selections and commands may be provided and initiated by an application stored on endpoint device 310. For example, the application may be a mobile banking application, digital wallet application, key generation application, electronic passport application, eticket application, etc. The application may be provided and supported by application server 320, and may also be associated with processing server computer 340 and/or authorizing computer 360.

Application server 320 may receive the enrollment request and identifying information contained therein. Application server 320 may then create an account for user 301 and may begin the process of generating an electronic identity for user 301. Application server 320 may submit the identifying information to authorizing computer 360 to receive additional information that may be used to generate a secret hash identifying user 301. Application server 320 may request the additional information in an identity request S303 comprising the identifying information. For example, application server 320 may send an identity request comprising user's name, address, etc. to an authorizing computer. The authorizing computer in this example may be an issuer computer of a banking institution or government authority. The issuer computer may receive the identifying information and may confirm user's identity. The issuer computer may then send additional information such as a social security number, primary account number, etc. to application server 320 in an identity response S304. Application server 320 may then generate an electronic identity by hashing the identifying information and/or received additional information. For example, an electronic identity may comprise a combination of a country code, customer name, date of birth, and last four digits of a social security number such as SHA256 (USA*JOHN SMITH*19700101*1234). Hashing this value may then result in a seemingly random string of characters, such as 754WD2E2513BF546050C2D079FF5D65AB6E318E. Application server may link the hash to user's account.

Once the electronic identity has been generated, application server 320 may generate a secret private key for user 301. Application server 320 may also generate a public verification key based on the private key. The electronic identity and public key may be stored in a database and linked to the account of user 301; however, the secret private key may be directly transmitted to endpoint device 310 for storage and may not be recorded by application server 320. The public key may be linked to user 301 in a relational database managed by application server 320 by linking the public key to account data of user 301 such as identifying information, device ID, account number, etc.

Application server 320 may then send the private key, electronic identity, and public key to endpoint device 310 for provisioning in S305. The provisioning data may be received by the application stored on endpoint device 310, which may store the private key in a secure element of endpoint device 310. According to one embodiment, the application may store the electronic identity and public key in a portion of endpoint device 310's memory dedicated to the application. In another embodiment, the electronic identity and/or public key may not be stored on endpoint device 310, and may instead be retrieved from application server 320 during a transaction in a cloud-based manner. In yet another embodiment, the electronic identity may be associated with a passphrase that is provided in order to access any interaction record associated with the electronic identity.

After successfully provisioning endpoint device 310, the application may display a biometric request S306 to the user on endpoint device 310's display. The request may prompt user 301 to provide a biometric sample that may later be used to verify user 301 and grant access to the securely stored private key. For example, endpoint device 310 may prompt user 301 to present one of his fingers to a fingerprint reader that is coupled to endpoint device 310. Similarly, endpoint device 310 may prompt user 301 to speak a phrase, which may be used to analyze user's voice during verification. In another example, a front-facing camera of endpoint device 310 may capture an image of user's face and may later use the image to confirm the user and allow them to conduct a transaction according to embodiments of the invention.

The user may then provide his biometric sample in S307. Endpoint device 310 may then capture the biometric sample and convert the sample into data. The data may then be stored on endpoint device 310 as a biometric reference template that may be retrieved and used for biometric verification according to embodiments of the invention. Endpoint device 310 may then send a confirmation request S308 to application server 320. Application server 320 may receive the request and may attempt to confirm that the system is properly set-up for user 301.

Application server 320 may first distribute data to the proper entities. For example, application server 320 may distribute the user's public key and electronic identity to the processing server computer 340 in S309. In one embodiment, processing server computer 340 and application server 320 are provided by the same entity. For example, application server 320 and processing server computer 340 may be of a payment processing network that provides secure payment solutions. Processing server computer 301 may receive the electronic identity and public key and use them to maintain and verify an electronic record associated with the electronic identity. The electronic identity and public key may further be distributed to distributed verification network 350 and/or authorizing computer 360 in S310 and S311 respectively. Each node in distributed verification network 350 may store an electronic record associated with the electronic identity, and the electronic identity and public key may later be used by the nodes to identify, verify, and maintain the electronic record. In one embodiment, authorizing computer 360 may be one of the nodes in distributed verification network 350.

Authorizing computer 360, distributed verification network 350, and processing server computer 340 may then send confirmations in S312, S313, and S314 respectively. The confirmations may comprise an indication that an electronic record has been created and that each entity stores a copy. The confirmations may be received by application server 320, which may then generate a confirmation response S315 to endpoint device 310. Endpoint device 310 may then display the confirmation response S316 to user 301, so that user 301 may confirm that his electronic identity has been successfully registered.

User 301 may then request the generation or replenishment of limited-use parameters, so that user 301 may securely use the electronic identity to conduct a transaction.

User 301 may submit a limited-use request S317, for example, by selecting a "replenish key" option provided by the application. In one embodiment, a limited-use request may require further authentication such as a password or form of verification that is different from the biometric verification used to grant access to the secret private key. The authentication data may be stored and verified by endpoint device 310 and/or application server 320.

The limited-use request may be sent to application server 320 in S318. The limited-use request may comprise a device ID, user account number, and user authentication data. Application server 320 may receive the limited-use request and may generate or replenish a limited-use key (LUK) for the account of user 301. The LUK may be stored in a relational database and linked to the account of user 301 along with limited-use parameters that constrain the use of the current LUK. The LUK and limited-use parameters may then be transmitted to and stored on endpoint device 310 in a limited-use response S319.

The LUK and limited-use parameters may then be used to securely transport user's electronic identity in a transaction. For example, the LUK may be used to generate a cryptogram comprising user's electronic identity, which is received by processing server computer 340. Processing server computer 340 may receive the cryptogram and then communicate with application server 320 to retrieve a symmetric decryption key along with the limited-use parameters. Processing server computer 340 may decrypt the cryptogram using the symmetric key and validate the limited-use parameters, so that the electronic identity and transaction may be processed. The limited-use parameters may be updated after a transaction is conducted, and user 301 may be alerted when an LUK has reached its limited-use threshold. User 301 may then replenish the limited-use parameters starting with S317 of FIG. 3. A transaction conducted according to an embodiment of the invention is further described below.

Figure 4:
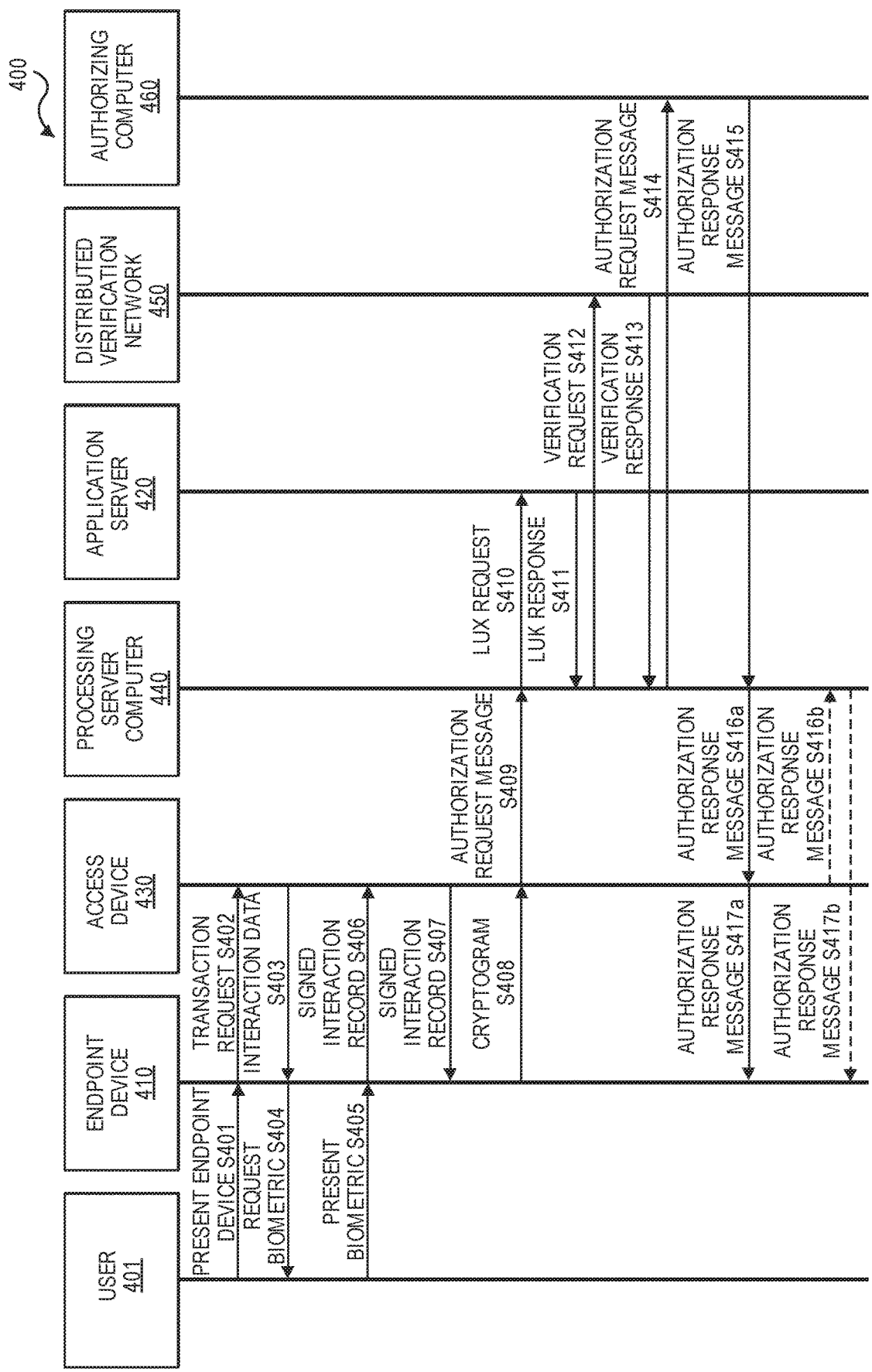
FIG. 4 shows a swim-lane diagram of a transaction process according to an embodiment of the invention.

FIG. 4 shows a diagram of a transaction process according to one embodiment of the invention. According to FIG. 4, user 401 may first initiate a transaction by presenting his endpoint device in S401. For example, user 401 may be at a checkout counter at a merchant, and may use his mobile phone to purchase selected items. Once user 401 has presented his endpoint device 410, user 401 may use endpoint device 410 to generate and send a transaction request S402. For example, user 401 may open an application that generates a transaction request when placed in close proximity to an access device. In another example, user 401 may select a "purchase item" or payment icon displayed on endpoint device 410, which may cause it to generate the transaction request and send the request to the access device 430.

The transaction request S402 may be sent to and received by access device 430, which may generate interaction data comprising information about the requested interaction or transaction such as transaction time stamp, transaction amount, merchant data, product data, terms and conditions, disclaimers, terms of service agreements, and/or any other relevant information needed to confirm and govern the requested interaction. The interaction data may then be sent to endpoint device 410 in S403.

Endpoint device 410 may receive the interaction data, which may be displayed to user 401 for confirmation. To confirm and sign the interaction, endpoint device 410 may request user's biometric in S404. User 401 may review and confirm the interaction data and provide his biometric sample to endpoint device for verification in S405. The biometric sample may then be received by endpoint device and matched to a stored biometric reference template to verify the human identity of the requesting user. For example, user 401 may present his thumb to a fingerprint reader of endpoint device 410 and may state the words, "I agree" into a microphone of endpoint device 410. Endpoint device 410 may then generate biometric sample templates from user's thumb and voice and may compare the sample templates to stored biometric reference templates to identify a match. If a match exists within a predetermined threshold, endpoint device 410 may generate an interaction record comprising the interaction data. Endpoint device 410 may append user's electronic identity to the interaction record, and may then sign the interaction record using user's private key. According to embodiments of the invention, user's private key may not be accessed or used in an interaction unless proper human identification is provided and verified. In one embodiment, at least a portion of user's provided biometric sample may be hashed and appended to the interaction record to later provide confirmation and receipt of user's signature during a dispute resolution.

The interaction record may then be sent to access device in S406 so that the resource provider may sign the interaction record with their private key. Access device 430 may sign the interaction record using a stored private key or by sending the interaction record to a resource provider computer. The resource provider computer may then sign the interaction record using the resource provider's private key and may send the signed interaction record back to access device 430 or to endpoint device 410.

Endpoint device 410 may then encrypt the interaction record using a limited-use key (LUK). The cryptogram may encode interaction data such as a transaction timestamp, as well as other data that may be validated during processing such as an unpredictable number, application transaction counter, transaction type, etc. The cryptogram may also be provided with or appended to additional clear text data such as a key index and sequence counter. The cryptogram may then be sent to access device 430 so that the interaction record may be submitted for processing. In an alternate embodiment of the invention, the resource provider may sign the interaction record before it is signed by user 401. In such an embodiment, the resource provider's signature may be appended to the interaction data, which may then be submitted to endpoint device 410 for user signing and encryption.

Once the cryptogram is received by access device 403 in S408, access device 430 or a resource provider computer coupled to access device 430 may generate an authorization request message comprising the cryptogram and clear text data. In some embodiments, the electronic identity may be in the authorization request message in the clear, in addition to or instead of being encoded in the cryptogram. In some embodiments, the authorization request message does not include a bank account number, or credit or debit card account number, or PAN (primary account number). An "authorization request message" may be an electronic message that is sent to request authorization for a transaction. The authorization request message can be sent to a payment processing network and/or an issuing entity such as a bank. An authorization request message according to some embodiments may comply with ISO 8583, which is a standard for systems that exchange electronic transaction information associated with a payment made by a user using a payment device or payment account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as a resource provider or access device identifier, merchant category code, etc.

Access device 430 may send the authorization request message to processing server computer 440 for processing in S409. Processing server computer 440 may receive the authorization request message and may begin processing the data and cryptogram contained therein. Processing server computer 440 may decrypt the cryptogram using a symmetric limited-use key. For example, the cryptogram may be provided with a key index, a dynamic set of data, or any other identifier that may be used to identify the origin of the LUK. Processing server computer 440 may identify that the LUK was generated by application server 420 and may submit an LUK request S410 comprising the key index or identifier. Application server 420 may then query a database for the symmetric limited-use key (LUK) that may be used to decrypt the cryptogram. Application server 420 may then submit the symmetric LUK and any other necessary information such as the expected state of limited-use parameters to processing server computer 440 in S411. For example, application server 420 may submit to processing server computer 440 an LUK response comprising a symmetric LUK and an expected application transaction counter value of '4'.

Processing server computer 440 may then receive the LUK response and use the received data to decrypt and validate the cryptogram. Processing server computer may then validate the limited-use parameters associated with the cryptogram by comparing their values to their expected state. For example, processing server computer 440 may determine that a received unpredictable number of '10294812095' does not match an expected unpredictable number of '039571590' and may therefore reject the transaction, regardless of the authenticity of the other data.

In some optional embodiments, if the limited-use parameters are deemed valid, processing server computer 440 may proceed to authenticating the electronic identity contained in the interaction record. Processing server computer 440 may first determine an electronic record associated with the electronic identity that may be obtained and verified.

Processing server computer 440 may have access to a block chain or distributed ledger that maintains a list of interaction records, each time-stamped and associated with one or more electronic identities and/or signing entities. Processing server computer 440 may query the block chain for a list of interactions associated with the received electronic identity, and may compile the interaction records into an electronic record. Processing server may then send a verification request S412 to distributed verification network 450, in which one or more of the nodes of distributed verification network 450 is asked to verify at least a portion of the interaction records in the electronic record (and optionally signatures appended to any interaction records).

The nodes in distributed verification network 450 may each maintain a copy of the block chain/distributed ledger, and may verify the signatures of the compiled electronic record and of the pending interaction record using stored public keys. Each node may verify an interaction record by inputting each digital signature and public key for the involved parties of the interaction into a verification algorithm. Each of the nodes may additionally choose to sign or notarize the pending transaction using their own private key. The nodes may reach a consensus as to authenticity of the electronic identity and of associated records, and may send the result to processing server computer 440 in a verification response S413.

Processing server computer 440 may receive the verification response and may proceed with authorization of the transaction if the verification yields positive results. In one embodiment, processing server computer 440 may determine a risk score for the pending interaction based on at least a portion of the electronic record or based on other data such as data from one or more of the nodes of distributed verification network 450.

Processing server computer 440 may then forward the authorization request message to authorizing computer 460 in S414. The authorization request message may comprise the electronic record and/or electronic identity as well as the risk score. Authorizing computer 460 may then approve or decline the transaction based on the received information. For example, authorizing computer 460 may use the electronic identity to find its own copy of the electronic record, and may evaluate the electronic record to determine if there are enough assets currently associated with the electronic identity to cover the pending transaction amount. In yet another embodiment, authorizing computer 460 may be a node of distributed verification network 450 and authentication and authorization of the interaction record may be performed simultaneously.

Authorizing computer 460 may send the result of authorization (e.g. approval or decline) in an authorization response message to processing server computer 440 in S415. An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may then later serve as proof of authorization.

If the transaction has been authorized, processing server computer 440 may publish the pending interaction record by appending the interaction record to the block chain/distributed ledger. Further, the nodes of verification network 450 may also receive notification that the interaction was authorized and may update their ledgers with the interaction record, thereby synching their copies of the electronic record.

According to one embodiment, the authorization response message may be forwarded to access device 430 in S416*a*. The access device 430 may then display and/or or transmit the authorization response message to endpoint device 410 in S417*a*. In another embodiment, the authorization response message may be sent to application server 420 in S416*b*. Application server 420 may then make a record of a successful transaction attributed to the account of user 401. Application server 420 may also update the state of the limited-use parameters associated with the LUK. Application server 420 may then submit an updated LUK and/or limited-use parameters and authorization result to endpoint device 410 in an authorization response message S417b. Endpoint device 410 may then display the authorization result to user 401 and replenish the LUK and limited-use parameters stored on the device.

In either case, if the transaction has been authorized, the interaction record may be accepted as official, and the proper assets may be officially allocated according to the terms of the interaction record.

Embodiments of the disclosure may provide a number of useful applications. For example, embodiments of the disclosure may provide users with a single form of electronic identification that may be used in a variety of scenarios. Embodiments of the invention allow entities to authenticate a user's identity by verifying with other trusted entities. The trusted entities may be hospitals, banks, governments, merchants, or individuals who may validate previous interactions with the user, thereby providing trust and assurance that the user is who they say they are. Furthermore, interactions are maintained in an immutable electronic record that is distributed to an entire trust network, which provides a single source of truth from which consensus can be reached. This allows a user to securely identify himself using only a single device, rather than carrying multiple ID cards, credit cards, passports, tickets, passes, etc.

Figure 5:
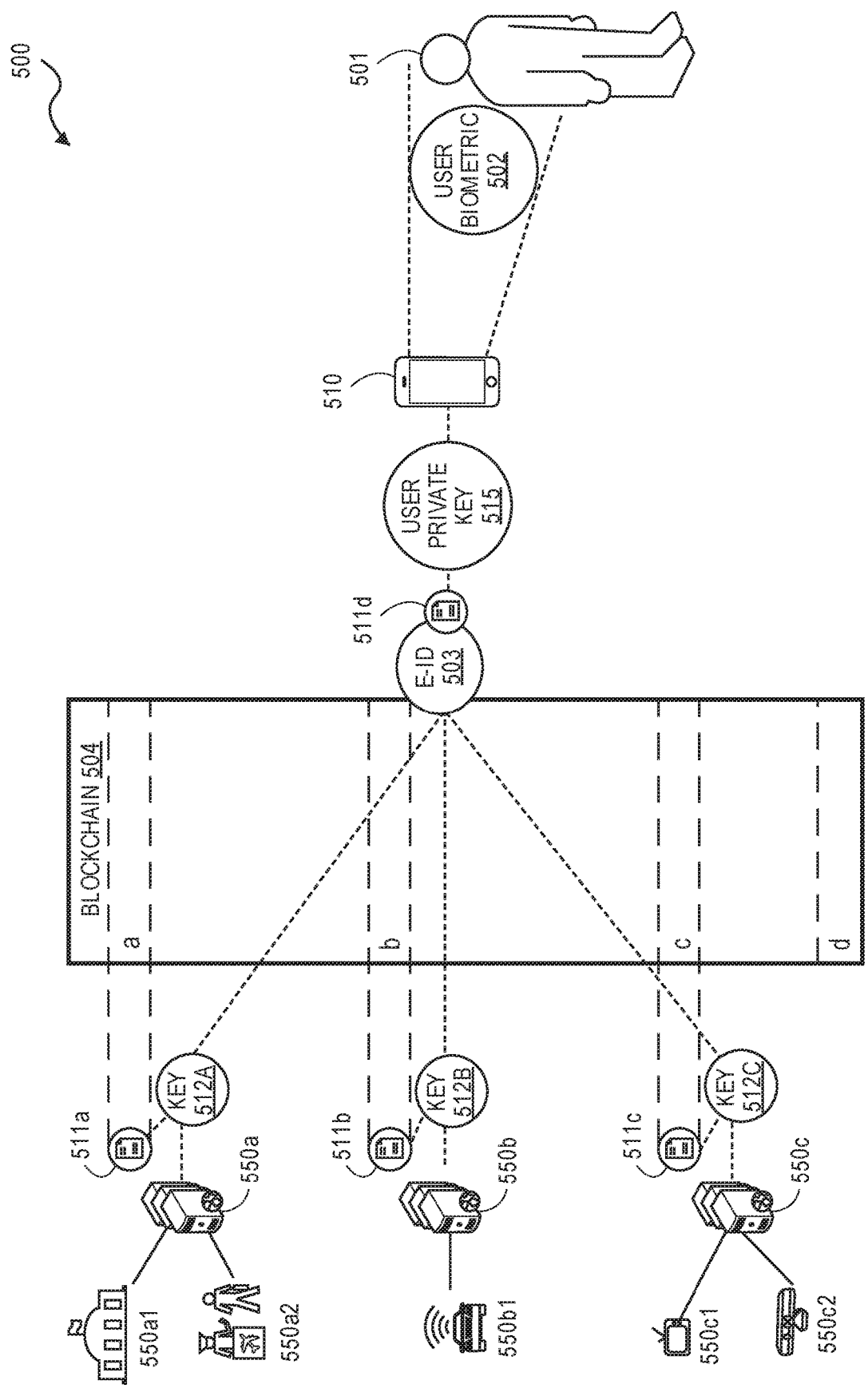
FIG. 5 depicts an example of an electronic record according to embodiments of the invention.

FIG. 5 depicts an example of an electronic record according to embodiments of the invention. In FIG. 5, user 501, wants to conduct a transaction using his electronic identity 503. User 501 may provide proof of his human identity by presenting user biometric 502 to endpoint device 510. Endpoint device 510 may generate an interaction record 511d for the transaction and may append user's electronic identity 503 to the interaction record as well as any other identifying information such as device ID, transaction timestamp, etc. Interaction record 511 may be signed using user private key 515 upon successful verification of user biometric 502. The interaction record may be encrypted or hashed before submission for processing. For example, interaction record 511 may be encrypted using a limited-use key (LUK) that is managed by an application server.

When an interaction record is received and decrypted during processing, an electronic record associated with the electronic identity 503 may be identified or compiled from blockchain 504. Each block in the blockchain 504 may contain a timestamp as well as a hash of the block before it, thereby generating a link between each consecutive block. A block may be composed of a transaction or interaction record that is hashed using a cryptographic hash function such as SHA-256. A block may also be composed of multiple transactions that are condensed and hashed in a binary tree structure (e.g. Merkle tree) to provide more efficient data storage.

To compile or identify the record, a processing server computer may query the blockchain for blocks that contain the unique string of characters that make up electronic identity 503. The processing server computer may then verify each interaction record in the electronic record (e.g. record a, b, and c) by calling out to trusted entities. Each trusted entity or node may have its own copy of blockchain 504, and may verify that each interaction record or block matches between nodes. Each trusted entity may also validate specific interaction records in the electronic record using a public key that confirms the origin of signatures attached to an interaction record. For example, a first interaction record 511a may be validated by a first trusted node 550a. First trusted node 550a may be a government server that may have previously authorized or initiated an interaction involving electronic identity 503. For example, user 501 may have used electronic identity 503 to submit a vote to government office 550a1 or to enter a security checkpoint 550a2. First trusted node 550a may validate first interaction record 511a using key 512A. Key 512A may be a public key of a device or computer supported by first trusted node 550a such as a computer of government office 550a1 or security checkpoint 550a2. Key 512A may be input into a verification algorithm along with the corresponding signature appended to first interaction record 511a. If the output to the verification matches an expected result, then first trusted node 550a may confirm or verify that the interaction record is valid and has not been altered or fraudulently created.

Similarly, a second interaction record 511b may be validated by second trusted node 550b. Second trusted node 550b may be a remote server that authorized user 501 access to vehicle 550b1. Second trusted node 550b may validate second interaction record 511b using key 512b, which may be a public verification key that is linked to vehicle 550b1 and is stored by second trusted node 550b. Additionally, a third interaction record 511c may also be validated by a third trusted node 550c. Third trusted node 550c may be a trust management server that manages various IoT devices owned by user 501 such as television 550c1 and audio system 550c2. Third trusted node 550c may proceed to validate third interaction record 511c using key 512c.

After the interaction records of the electronic record have been validated, an authorizing computer may authorize interaction record 511d based on at least a portion of the electronic record. For example, the authorizing computer may be of a bank that determines if there are enough assets attributed to electronic identity 503 to conduct a specific transaction. Once authorized, interaction record 511d may be added to blockchain 504 by the authorizing computer or processing server computer. Interaction record 511d may be added in a new block to blockchain 504 by appending a hash of the previous block to the new block and communicating the addition to all of the trusted nodes so that they may update their own copy of blockchain 504. Interaction record 511d may now be an immutable record attributed to electronic identity 503, and may later be used to verify/authenticate user's identity in a future transaction.

Figure 6:
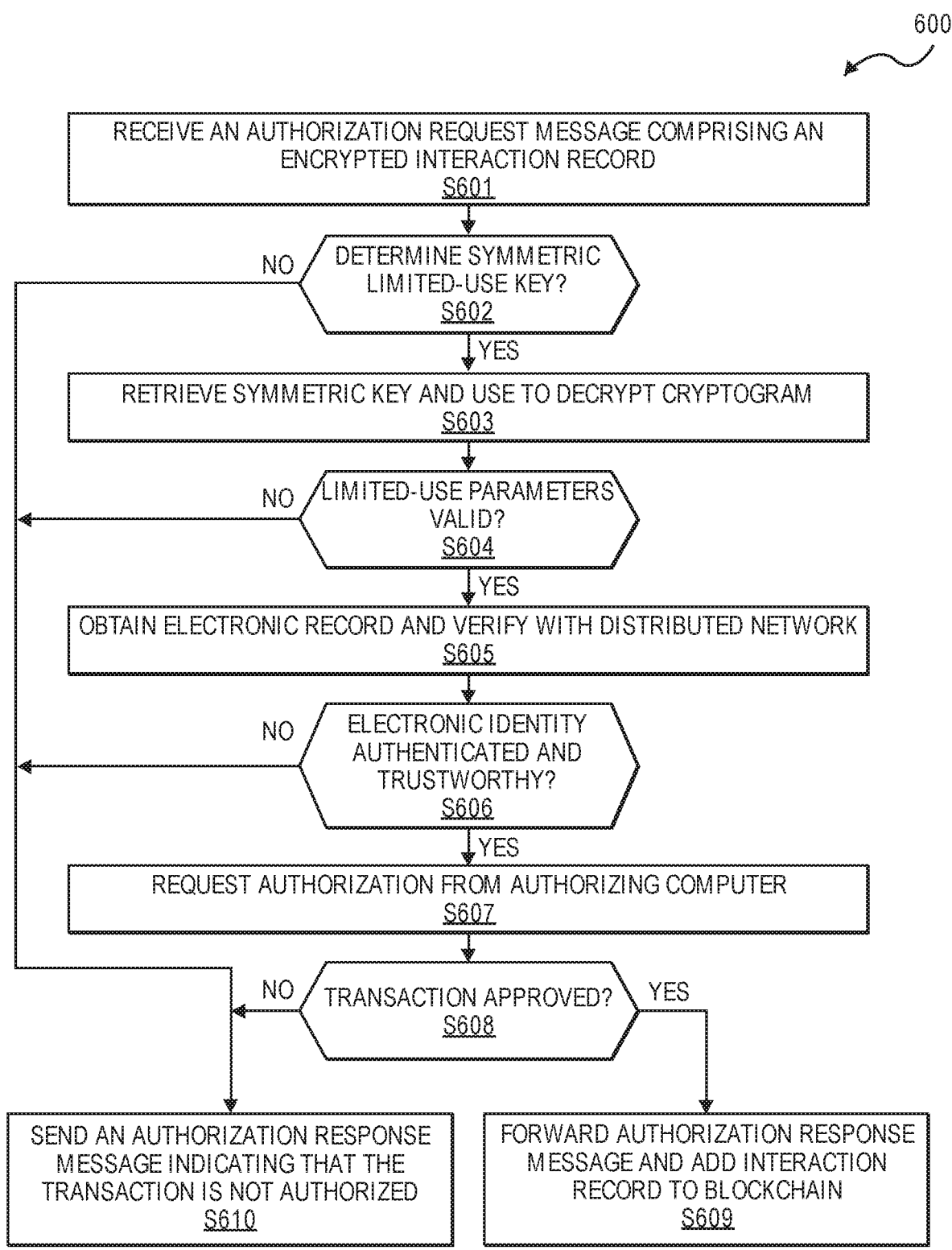
FIG. 6 shows a process flow diagram for validating a transaction according to an embodiment of the invention.

FIG. 6 shows a process flow diagram for validating a transaction according to an embodiment of the invention. The process shown in diagram 600 may be carried out by a processing server computer in the form of logic, and may be used to determine if a proposed transaction is valid. According to diagram 600, a processing server computer may first receive an authorization request message comprising an encrypted interaction record (i.e. a cryptogram) in S601. The message may be received from an access device and may comprise a transaction requested by one or more electronic identities. In S602, the processing server computer may determine if there exists a symmetric limited-use key that may decrypt the encrypted interaction record. For example, the authorization request message may comprise a key index identifying the location of the key or public address of an application server that manages the key. If a symmetric limited-use key exists, then the processing server computer may retrieve the symmetric key and use it to decrypt the cryptogram. Otherwise, the processing server computer may invalidate the transaction in S610.

Once the cryptogram has been decrypted, the processing server computer may determine if the associated limited-use parameters are valid. For example, the cryptogram may have been encrypted using a limited-use key (LUK) in which transactions may be invalidated when the LUK has been used for greater than $1000 worth of transactions. According to embodiments of the invention, if the limited-use parameters are valid then the processing server computer may obtain/compile an electronic record from a shared blockchain in S605. The electronic record may be associated with an electronic identity appended to the interaction record, and may be verified by trusted nodes in a distributed network. The processing server computer may receive a verification response from the trusted nodes indicating if the interactions listed in the electronic record are valid.

The processing server computer may receive the verification response and may determine, based on the verification response, if the electronic identity requesting the transaction is authentic and trustworthy in S606. If the electronic identity is authenticated, the processing server computer may forward the authorization request message to an authorizing computer in S607. Otherwise, the transaction may be invalidated in S610. The authorizing computer may receive the authorization request message and may authorize the underlying transaction based on at least a portion of the electronic record associated with the electronic identity. The authorizing computer may then send an authorization response message comprising an indication of approval or decline to the processing server computer.

The processing server computer may receive the authorization response message in step S608. If the transaction has been approved by the authorizing computer, the processing server computer may add the transaction in a new block to the shared blockchain and may forward the authorization response message to the access device in S609. The access device may receive the authorization response message confirming that the transaction has been approved and accounted for. If the transaction has not been approved, then the processing server computer may forward the authorization response message containing the indication of decline to the access device in S610.

Embodiments of the invention provide for a number of technical advantages. For example, embodiments of the invention provide a system for identifying an individual in a secure manner. Users are provided with an electronic identity that is unique and can be securely stored on an electronic device. A user can only use an electronic identity to identify themselves if they first provide human identification through biometric verification. Interactions involving an electronic identity are maintained in immutable blocks of a blockchain shared between trusted entities.

Figure 7:
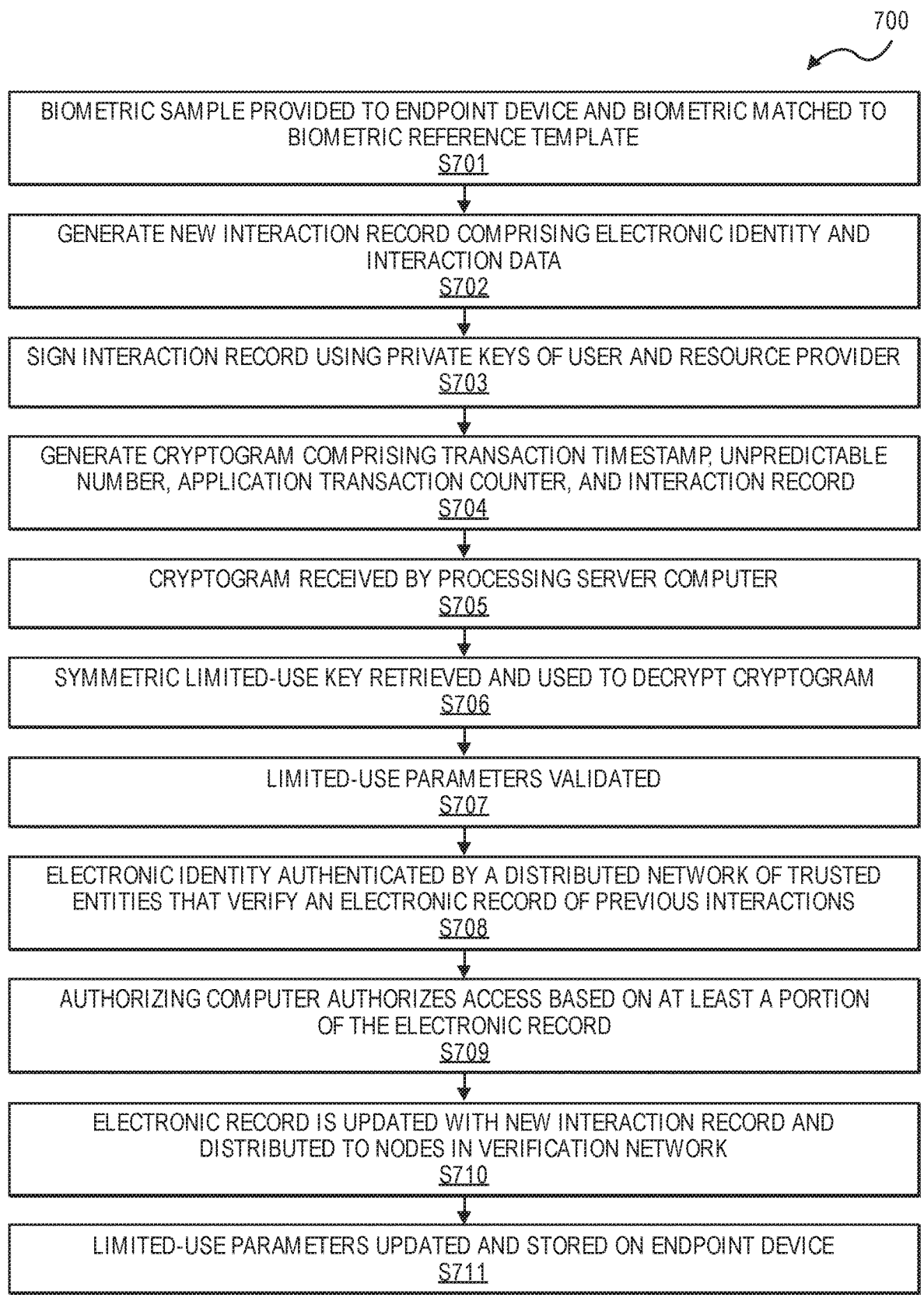
FIG. 7 shows a flow diagram of a method for securely processing an electronic identity according to an embodiment of the invention.

FIG. 7 shows a flow diagram of a method for securely processing an electronic identity according to an embodiment of the invention. According to diagram 700, a biometric sample is first provided by a user to an endpoint device and matched to a stored biometric reference template in S701. In S702, a new interaction record is generated, the interaction record comprising an electronic identity of the user and interaction data. In S703, the interaction record is signed using the private keys of the interacting parties. In S704, a limited-use key is used to generate a cryptogram encoding a transaction timestamp, transaction amount, unpredictable number, application transaction counter, and the interaction record.

In S705, the cryptogram is received by a processing server computer. In S706, the processing server computer retrieves a symmetric limited-use key (LUK) and uses it to decrypt the cryptogram. In S707, the limited-use parameters associated with the LUK are validated. In S708, an electronic record associated with the electronic identity is verified based on the validity of previous interactions and signatures. A consensus is reached between trusted nodes of a distributed network as to the authenticity of the electronic identity.

In S709, an authorizing computer authorizes the interaction record based on at least a portion of the electronic record. In S710, the electronic record/blockchain is updated with the new interaction record, and the update is communicated to the trusted nodes so that they may synch their copies of the blockchain. In S711, the limited-use parameters are updated by an application server and stored on the endpoint device or in an account of the user.

It should be understood that reference to the entities described in the figures described above, including user, endpoint device, access device, processing server computer, application server, distributed verification network, and authorizing computer may be a reference to the same corresponding entities described in other figures such as user 101, endpoint device 110, application server 120, access device 130, processing server computer 140, distributed verification network 150, and authorizing computer 160 of FIG. 1.

It should also be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
  receiving, by an endpoint device, from an access device, interaction data;
  generating, by the endpoint device, an interaction record comprising the interaction data and an electronic identity of a user, the electronic identity being mathematically derived from a combination of information associated with the user;
  retrieving, by the endpoint device, a private key of the user;
  signing, by the endpoint device, the interaction record using the private key of the user;
  encrypting, by the endpoint device, at least the interaction data using a limited-use key associated with limited-use parameters to form a cryptogram; and
  transmitting, by the endpoint device, to the access device, the cryptogram and the signed interaction record, wherein the cryptogram is thereafter forwarded to a server computer in an authorization request message, and wherein the server computer is configured to decrypt the cryptogram and validate the electronic identity,
  wherein the signed interaction record is also signed using a private key of a resource provider and further comprises a transaction timestamp.

2. The method of claim 1, wherein the cryptogram encodes a transaction amount, an unpredictable number, and an application transaction counter.

3. The method of claim 1, wherein the endpoint device comprises a biometric reader.

4. The method of claim 1, the server computer validates the electronic identity utilizing a distributed network, the distributed network comprising a blockchain.

5. The method of claim 1, wherein encrypting at least the interaction data comprises encrypting at least the interaction record including the electronic identity.

6. The method of claim 1, wherein the electronic identity is a hash of information associated with the user.

7. The method of claim 1, therein the authorization request message is an ISO 8583 message.

8. The method of claim 1, further comprising:
  receiving, by the endpoint device, a biometric sample of the user; and
  comparing, by the endpoint device, the received biometric sample with a stored biometric sample, and determining that the received biometric sample matches the stored biometric sample.

9. The method of claim 1, wherein the endpoint device is a mobile phone.

10. The method of claim 1, wherein the access device is a point of sale terminal.

11. The method of claim 1, wherein the endpoint device is a mobile phone.

12. The method of claim 1, wherein the interaction data comprises a transaction amount.

13. The method of claim 1, wherein the interaction data comprises a resource provider identifier.

14. The method of claim 1, wherein the interaction data comprises an access device identifier.

15. An endpoint device comprising:
  a processor; and
  a non-transitory computer-readable medium comprising code for instructing the processor to implement a method, the method comprising:
  receiving, by the endpoint device, from an access device, interaction data,
  generating, by the endpoint device, an interaction record comprising the interaction data and an electronic identity of a user, the electronic identity being mathematically derived from a combination of information associated with the user,
  retrieving, by the endpoint device, a private key of the user,
  signing, by the endpoint device, the interaction record using the private key of the user,
  encrypting, by the endpoint device, at least the interaction data using a limited-use key associated with limited-use parameters to form a cryptogram, and
  transmitting, by the endpoint device, to the access device, the cryptogram and the signed interaction record, wherein the cryptogram is thereafter forwarded to a server computer in an authorization request message, and wherein the server computer is configured to decrypt the cryptogram and validate the electronic identity,
  wherein the signed interaction record is also signed using a private key of a resource provider and further comprises a transaction timestamp.

16. The endpoint device of claim 15, the server computer validates the electronic identity utilizing a distributed network, the distributed network comprising a blockchain.

17. The endpoint device of claim 15, wherein transmitting also comprises transmitting a key index.

18. The endpoint device of claim 15, wherein the limited-use key is retrieved from an application server.

19. The endpoint device of claim 15, the electronic identity is a hash of information associated with the user.

20. The endpoint device of claim 19, wherein the authorization request message is an ISO 8583 message.

* * * * *